United States Patent
Park et al.

(10) Patent No.: US 10,132,252 B2
(45) Date of Patent: *Nov. 20, 2018

(54) ENGINE SYSTEM

(71) Applicant: Hyundai Motor Company, Seoul (KR)

(72) Inventors: Jong Il Park, Seoul (KR); Dong Hee Han, Seoul (KR); Il Joong Hwang, Hwaseong-si (KR); Hyungbok Lee, Seongnam-si (KR); Seungwoo Hong, Seoul (KR); Nahm Roh Joo, Yongin-si (KR); Hyun Jun Lim, Incheon (KR)

(73) Assignee: Hyundai Motor Company, Seoul (KR)

( * ) Notice: Subject to any disclaimer, the term of this patent is extended or adjusted under 35 U.S.C. 154(b) by 15 days.

This patent is subject to a terminal disclaimer.

(21) Appl. No.: 15/377,883

(22) Filed: Dec. 13, 2016

(65) Prior Publication Data

US 2018/0051642 A1    Feb. 22, 2018

(30) Foreign Application Priority Data

Aug. 22, 2016 (KR) .................. 10-2016-0106270

(51) Int. Cl.
| | |
|---|---|
| *F02B 33/44* | (2006.01) |
| *F02D 23/00* | (2006.01) |
| *F02D 41/00* | (2006.01) |
| *F02B 37/10* | (2006.01) |
| *F02B 75/22* | (2006.01) |

(Continued)

(52) U.S. Cl.
CPC .......... *F02D 41/0082* (2013.01); *F02B 37/04* (2013.01); *F02B 37/10* (2013.01); *F02B 39/10* (2013.01); *F02B 75/22* (2013.01); *F02B 75/227* (2013.01); *F02D 9/02* (2013.01); *F02D 17/02* (2013.01); *F02D 23/00* (2013.01); *F02D 41/0007* (2013.01); *F02D 41/0087* (2013.01);

(Continued)

(58) Field of Classification Search
CPC .... F02B 37/001; F02B 37/004; F02B 37/007; F02B 37/013; F02B 37/16; F02M 26/15
USPC .................................. 60/612, 611; 123/562
See application file for complete search history.

(56) References Cited

U.S. PATENT DOCUMENTS

| | | | |
|---|---|---|---|
| 6,715,289 B2 * | 4/2004 | Mader ............... | F02B 37/007 |
| | | | 123/198 F |
| 9,121,338 B1 * | 9/2015 | Wu ..................... | F02B 37/007 |

(Continued)

FOREIGN PATENT DOCUMENTS

| | | | | |
|---|---|---|---|---|
| DE | 202015102239 U1 * | 6/2015 | ............ | F02M 26/08 |
| JP | 2005-291020 A | 10/2005 | | |

(Continued)

*Primary Examiner* — Ngoc T Nguyen
(74) *Attorney, Agent, or Firm* — Morgan, Lewis & Bockius LLP (57) ABSTRACT

An engine system may include an engine including first and second cylinder banks; a throttle valve; a first exhaust manifold gathering exhaust gas exhausted from the first cylinder bank to be supplied to the first exhaust line; a second exhaust manifold gathering exhaust gas exhausted from the second cylinder bank to be supplied to the second exhaust line; a turbocharger including a turbine rotated by the exhaust gas exhausted through the first exhaust manifold and a compressor rotated in connection with the turbine; a cylinder deactivation (CDA) device selectively deactivating the cylinders of the first cylinder bank; and a supercharger including a motor and an electric compressor operated by the motor.

9 Claims, 5 Drawing Sheets

(51) Int. Cl.
  *F02D 9/02*    (2006.01)
  *F02M 35/10*   (2006.01)
  *F02B 37/04*   (2006.01)
  *F02B 39/10*   (2006.01)
  *F02D 17/02*   (2006.01)

(52) U.S. Cl.
  CPC .............. *F02M 35/10163* (2013.01); *F02D 2200/1002* (2013.01)

(56) References Cited

U.S. PATENT DOCUMENTS

| | | | | |
|---|---|---|---|---|
| 2006/0021347 | A1* | 2/2006 | Sun | F02B 37/013 60/612 |
| 2015/0361927 | A1* | 12/2015 | Glugla | F02M 25/0749 60/603 |
| 2017/0159580 | A1* | 6/2017 | Han | F02D 17/02 |
| 2018/0058289 | A1* | 3/2018 | Lee | B01D 53/9495 |

FOREIGN PATENT DOCUMENTS

| | | |
|---|---|---|
| JP | 2011-241713 A | 12/2011 |
| JP | 2016-138502 A | 8/2016 |

\* cited by examiner

ENGINE SYSTEM

CROSS-REFERENCE TO RELATED APPLICATION

The present application claims priority to and the benefit of Korean Patent Application No. 10-2016-0106270 filed on Aug. 22, 2016, the entire contents of which are incorporated herein by reference.

BACKGROUND OF THE INVENTION

Field of the Invention

The present invention relates to an engine system. More particularly, the present invention relates to an engine system including a turbocharger and an electric supercharger and deactivating a portion of cylinders by a cylinder deactivation (CDA) device depending on a driving region of a vehicle.

Description of Related Art

An engine of a vehicle combusts a mixture of air inflowing from the outside and a fuel with an appropriate ratio to generate a power.

In a process of generating the power by driving the engine, the external air for the combustion must be appropriately supplied to obtain a desired output and combustion efficiency. For this, a turbocharger as a device turbocharging the air for the combustion to increase the combustion efficiency of the engine is used.

In general, a turbocharger is a device that rotates a turbine by using pressure of exhaust gas discharged from an engine and thereby increases output of the engine by supplying high-pressure air to a cylinder by using rotational force thereof. The turbocharger is applied to most diesel engines and is has also recently been applied to gasoline engines.

The turbocharger includes a wastegate valve controlling an amount of exhaust gas that is exhausted from the cylinder to be supplied to the turbine. A cost of the wastegate valve used in the turbocharger is very high.

As another example of an intake boost device, an electric supercharger using a motor to drive a compressor to compress external air has been used. Since the electric supercharger is driven by a battery, there is little boost, and it mainly supplies supercharged air to the cylinder in a low speed and low load region.

In general, the turbocharger (hereinafter referred to as 'a mechanical turbocharger') operated by the exhaust gas has low responsiveness, and it is difficult to realize a high compression ratio because of a magnitude of a back pressure.

In general, in the electric supercharger used in the vehicle, since an output of the motor is limited, a boosting region is limited to a low and middle speed region.

Accordingly, development of an engine system of a new concept including both the mechanical turbocharger and the electric supercharger is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an engine system of the new concept including the mechanical turbocharger operated by the exhaust gas and the electric turbocharger operated by the motor.

In addition, various aspects of the present invention are directed to providing the engine system reducing the back pressure and realizing the high compression ratio by deactivating the portion of cylinders through the cylinder deactivation (CDA) device in the low speed region and by bypassing the exhaust gas exhausted from the activated cylinders from the turbocharger.

Further, various aspects of the present invention are directed to providing an engine system reducing an unnecessary pumping loss and improving the fuel consumption by deactivating the portion of cylinders in the low speed region.

An engine system may include an engine including a first cylinder bank and a second cylinder bank including a plurality of cylinders generating a driving torque by combustion of a fuel; a throttle valve provided at an intake manifold distributing an intake gas to the cylinders of the first cylinder bank and the second cylinder bank to control an intake gas amount; a first exhaust manifold gathering exhaust gas exhausted from the cylinders of the first cylinder bank to be supplied to the first exhaust line; a second exhaust manifold gathering exhaust gas exhausted from the cylinders of the second cylinder bank to be supplied to the second exhaust line; a turbocharger including a turbine rotated by the exhaust gas exhausted through the first exhaust manifold and a compressor rotated in connection with the turbine to compress external air; a cylinder deactivation (CDA) device selectively deactivating the cylinders of the first cylinder bank; and a supercharger including a motor to supply supercharged air to the cylinders and an electric compressor operated by the motor, wherein the exhaust gas exhausted through the second exhaust manifold is exhausted without passing through the turbine.

A bypass line bypassing a part of air supplied to the supercharger may be provided at the intake line, and a bypass valve may be mounted at the bypass line.

The CDA device may be operated in a low speed low load region to deactivate the cylinders of the first cylinder bank.

When the cylinders of the first cylinder bank are deactivated by the CDA device, an engine load may be controlled through a supercharged pressure of the supercharger and an opening of the throttle valve.

In a low speed high load region, the CDA device may not be operated, the engine load may be controlled through the supercharged pressure of the supercharger and the opening of the throttle valve, and the bypass valve may be blocked.

In a middle speed region, the engine load may be controlled through a supercharged pressure of the turbocharger and the supercharger and the opening of the throttle valve, and the bypass valve may be blocked.

In high speed region, the supercharger may not be operated and the engine load may be controlled through the turbocharged pressure of the turbocharger and the opening of the throttle valve.

The engine may be a V-type engine.

The engine may be a W-type engine.

According to the engine system according to an exemplary embodiment of the present invention, the exhaust gas exhausted from the portion of cylinders operates the turbocharger, and the exhaust gas exhausted from the rest of the cylinders is directly exhausted to the exhaust gas processing device such that a back pressure may be reduced and a high compression ratio engine may be realized.

Also, the exhaust gas exhausted from the portion of cylinders operates the turbocharger, and the exhaust gas exhausted from the rest of the cylinders is directly exhausted to the exhaust gas processing device 70 such that a wastegate of a high cost may be omitted.

Also, the portion of cylinders are deactivated through the CDA device and the air supplied to the rest of the cylinders is supercharged by the electric supercharger in the low speed region such that high responsiveness in the low speed region may be realized.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The parts not related to the description of the exemplary embodiments are not shown to make the description clear, and like reference numerals designate like elements throughout the specification.

The sizes and thicknesses of the configurations shown in the drawings are selectively provided for convenience of description, such that the present invention is not limited to those shown in the drawings, and a thicknesses are exaggerated to make some parts and regions clear.

Now, an engine system according to an exemplary embodiment of the present invention will be described with reference to accompanying drawings.

Figure 1:
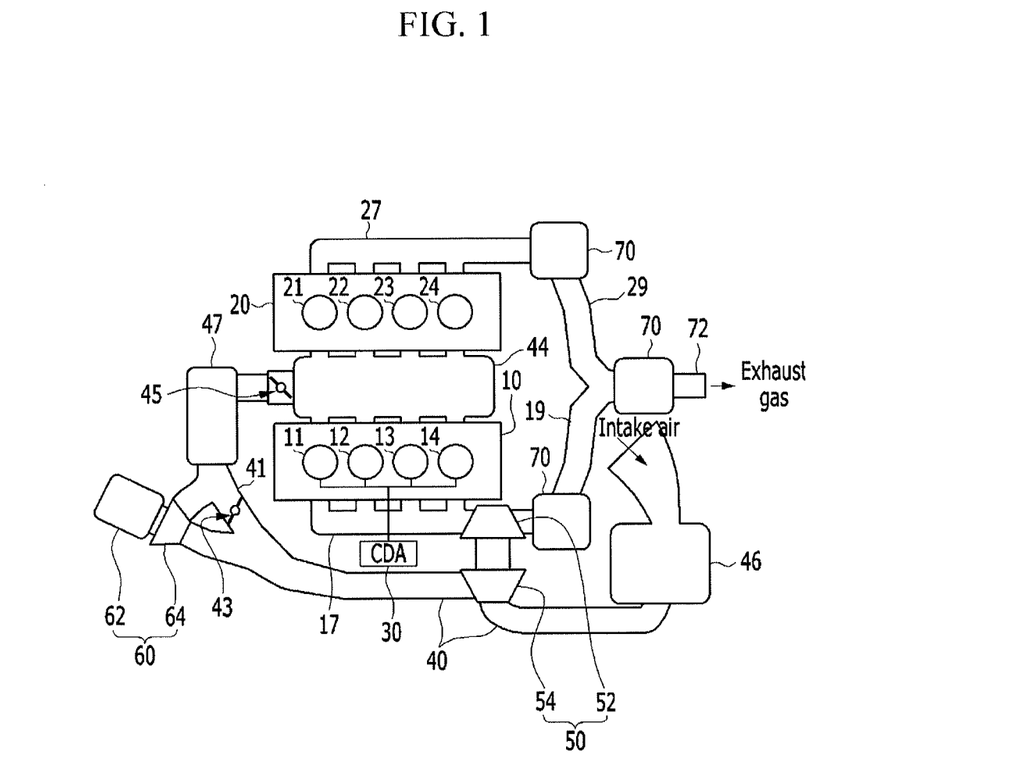
FIG. 1 is a schematic view showing a configuration of an engine system according to an exemplary embodiment of the present invention.
Figure 2:
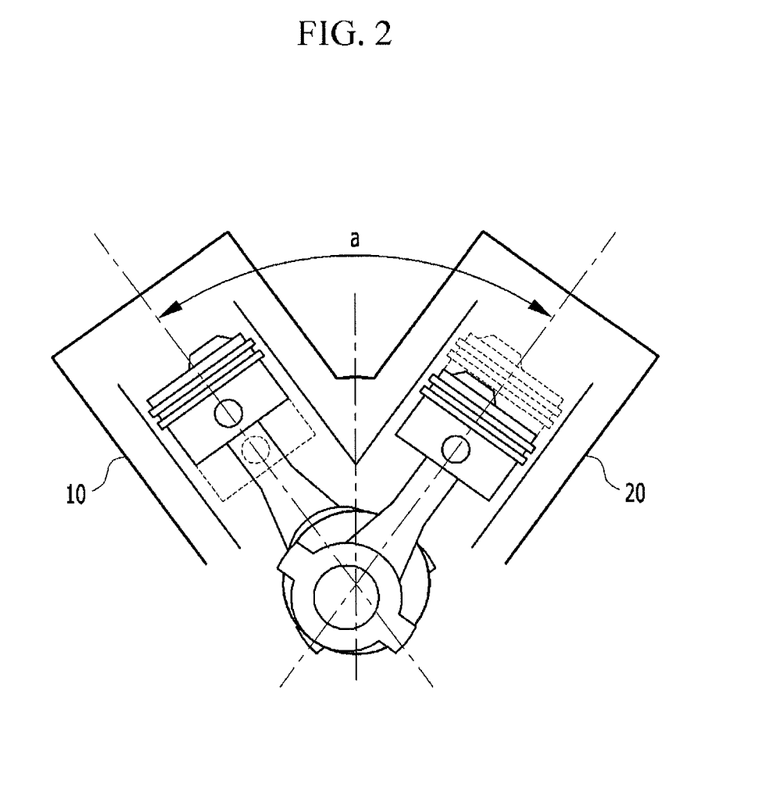
FIG. 2 is a lateral view showing a configuration of an engine system according to an exemplary embodiment of the present invention.

FIG. 1 is a schematic view showing a configuration of an engine system according to an exemplary embodiment of the present invention. FIG. 2 is a lateral view showing a configuration of an engine system according to an exemplary embodiment of the present invention.

As shown in FIG. 1 and FIG. 2, the engine system according to an exemplary embodiment of the present invention includes an engine including a plurality of cylinders generating a driving torque by combustion of a fuel, a turbocharger 50 supplying turbocharged air to the cylinders, a CDA (cylinder deactivation) device 30 selectively deactivating a portion of the cylinders, an electric supercharger 60 supplying the supercharged air to the cylinders and operated by a motor 62, and an exhaust manifold connected to the cylinders.

The engine is divided into a first cylinder bank 10 and a second cylinder bank 20, and each cylinder bank includes a plurality of cylinders. The engine may be a V-type engine in which the cylinders (11, 12, 13, and 14) of the first cylinder bank 10 and the cylinders (21, 22, 23, and 24) of the second cylinder bank 20 are positioned to be separated by a predetermined angle (an angle of a degrees) (e.g., 60 degrees-120 degrees) based on a crankshaft.

The engine may be a six-cylinder engine in which three cylinders are included in each cylinder bank. However, the scope of the present invention is not limited thereto, and the engine may be realized as an eight-cylinder engine or a twelve-cylinder engine.

Figure 3:
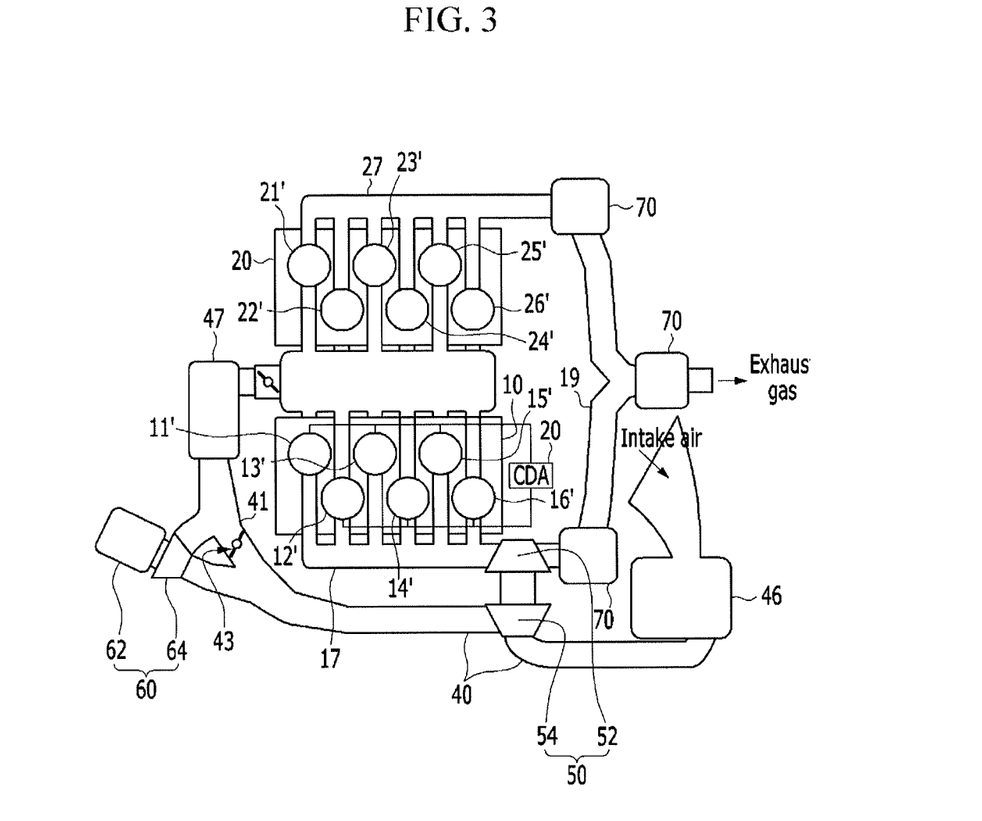
FIG. 3 is a schematic view showing a configuration of an engine system according to another exemplary embodiment of the present invention.
Figure 4:
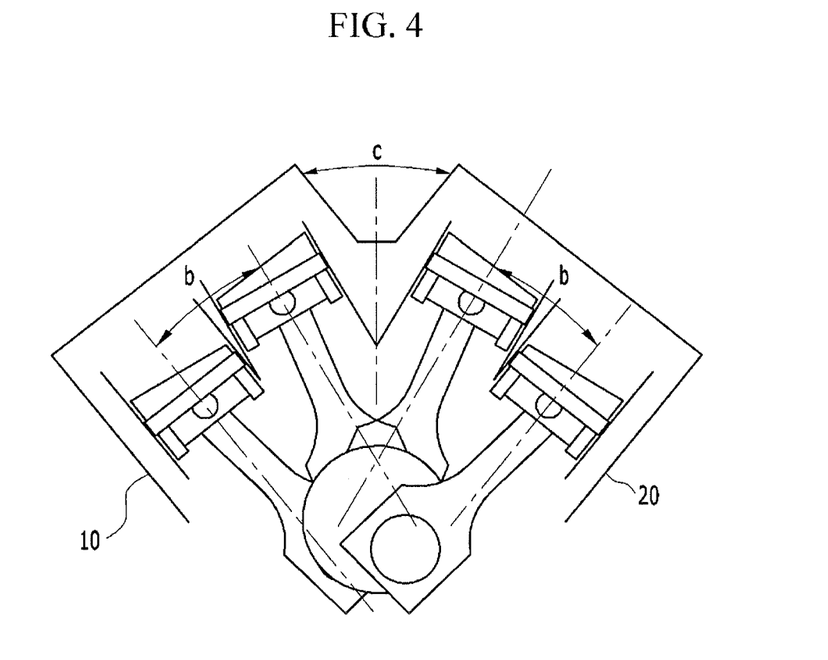
FIG. 4 is a lateral view showing a configuration of an engine system according to another exemplary embodiment of the present invention.

Alternatively, as shown in FIG. 3 and FIG. 4, the engine is divided into the first cylinder bank 10 and the second cylinder bank 20, the cylinders of the first cylinder bank 10 are divided into a first cylinder group (11', 13', and 15') and a second cylinder group (12', 14', and 16'), the first cylinder group (11', 13', and 15') and the second cylinder group (12', 14', and 16') are positioned to be separated by a first predetermined angle (b) (e.g., 15 degrees) based on the crankshaft, the cylinders of the second cylinder bank 20 are divided into a third cylinder group (21', 23', and 25') and a fourth cylinder group (22', 24', and 26'), the third cylinder group (21', 23', and 25') and the fourth cylinder group (22', 24', and 26') are positioned to be separated by a second predetermined angle (b) (e.g., 15 degrees) based on the crankshaft, and the first cylinder bank 10 and the second cylinder bank 20 are positioned to be separated by a third predetermined angle (c) (e.g., 70 degrees), thereby being a W-type engine.

In the instant case, the engine may be a twelve-cylinder engine in which each cylinder bank includes six cylinders. However, the scope of the present invention is not limited thereto, and the engine may be realized as a sixteen or more cylinder engine.

Again referring to FIG. 1 and FIG. 2, an intake manifold 44 distributing the intake gas to the cylinders of the first cylinder bank 10 and the cylinders of the second cylinder bank 20 is positioned at a center of the first cylinder bank 10 and the second cylinder bank 20, and a throttle valve 45 controlling an intake gas amount is positioned at the intake manifold 44.

The exhaust manifold includes a first exhaust manifold 17 and a second exhaust manifold 27. The first exhaust manifold 17 gathers the exhaust gas exhausted from the cylinders of the first cylinder bank 10 to be supplied to a first exhaust line 19. The second exhaust manifold 27 gathers the exhaust gas exhausted from the cylinders of the second cylinder bank 20 to be supplied to a second exhaust line 29. The first exhaust line 19 and the second exhaust line 29 are joined to a main exhaust line 72. An exhaust gas processing device 70 purifying the exhaust gas may be mounted to each of the first exhaust line 19, the second exhaust line 29, and the main exhaust line 72.

The cylinder deactivation (CDA) device is mounted to the cylinders of the first cylinder bank 10 to selectively deactivate the cylinders of the first cylinder bank 10. While the CDA device 30 is operating, the fuel is not supplied to the cylinders that are deactivation targets, and operation of intake valves and exhaust valves thereof is stopped. The CDA device 30 uses a technique included in a Field of the Invention including the present invention and a description thereof is omitted.

The turbocharger 50 to supply turbocharged air to the cylinders includes a turbine 52 rotated by the exhaust gas exhausted through the first exhaust manifold 17 and a compressor 54 rotated in connection with the turbine 52 to compress external air. In the instant case, the turbine 52 is mounted at the first exhaust line 19 and is configured to be operated by the exhaust gas flowing in the exhaust line, and the compressor 54 is mounted at an intake line 40 flowing the external air and compresses the intake gas to be supplied to the cylinder through the intake manifold 44.

That is, the turbocharger 50 is configured to be operated by the exhaust gas exhausted through the first exhaust manifold 17. However, the exhaust gas exhausted through the second exhaust manifold 27 is exhausted through the second exhaust line 29 and the main exhaust line 72 without passing through the turbine 52 of the turbocharger 50.

The electric supercharger 60 is used to supply the supercharged air to the cylinders, and includes the motor 62 and an electric compressor 64. The electric compressor 64 is configured to be operated by the motor 62 and compresses the external air depending on the driving conditions to be supplied to the cylinders. The electric supercharger 60 is mounted at the intake line 40.

An air cleaner 46 filtering the external air and an intercooler 47 cooling the external air supplied to the cylinder are mounted at the intake line 40.

That is, the air cleaner 46, the compressor 54 of the turbocharger 50, the electric supercharger 60, and the intercooler 47 are sequentially positioned downstream from upstream of the intake line 40.

Meanwhile, a bypass line 41 bypassing a part of the air supplied to the electric supercharger 60 is provided at the intake line 40. A bypass valve 43 is mounted at the bypass line 41. The intake gas amount bypassing the electric supercharger 60 is controlled through an opening of the bypass valve 43.

Hereinafter, an operation of the engine system according to an exemplary embodiment of the present invention will be described with reference to accompanying drawings.

Figure 5:
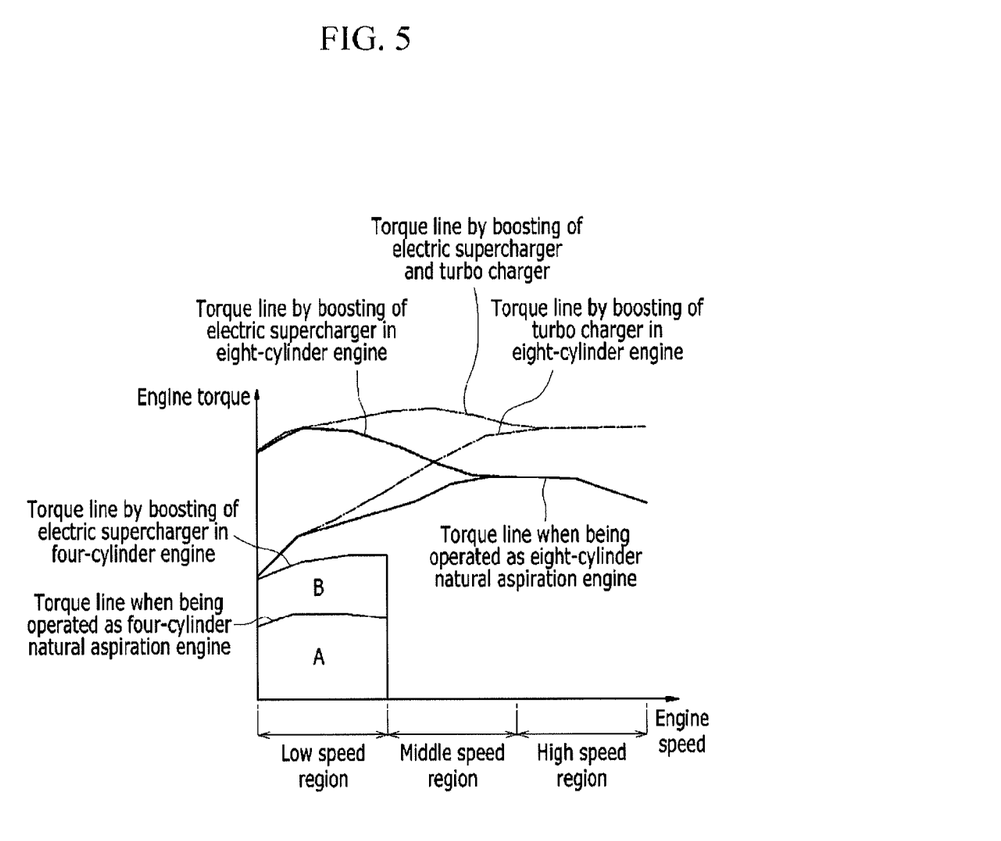
FIG. 5 is a graph of a driving region according to an exemplary embodiment of the present invention.

FIG. 5 is a graph showing a driving region according to an exemplary embodiment of the present invention. In FIG. 5, a horizontal axis represents the engine rotation speed, and a vertical axis represents the engine torque.

In FIG. 5, a solid line is a torque line of the engine when the engine is configured to be operated as a naturally aspirated engine, a dotted line is a torque line of the engine through boosting of the electric supercharger 60, a one-point chain line is a torque line of the engine through boosting of the turbocharger 50, and a two-point chain line is a torque line of the engine by the boosting of the electric supercharger 60 and the turbocharger 50.

Referring to FIG. 5, in a low speed low load region in which the engine speed (rpm) and the engine load are relatively smaller than predetermined amount, the CDA device 30 is operated to deactivate the cylinders of the first cylinder bank 10. Since the cylinders of the first cylinder bank 10 are deactivated, the exhaust gas is only exhausted through the second exhaust manifold 27 connected to the second cylinder bank 20, whereby the turbocharger 50 is not operated.

Accordingly, the engine is configured to be operated as the four-cylinder engine of which only the cylinders of the second cylinder bank 20 are operated, and the supercharged air is supplied to the cylinders of the second cylinder bank 20 through the electric supercharger 60.

In the low speed low load region, the engine load is controlled through the supercharged pressure by control of the motor 62 of the electric supercharger 60 and the opening of the throttle valve 45.

In this case, the exhaust gas exhausted from the cylinders of the second cylinder bank 20 is exhausted to the main exhaust line through the second exhaust manifold 27 and the second exhaust line 29 without passing through the turbocharger 50, thereby reducing back pressure. Therefore, ignition timing of the cylinders of the second cylinder bank 20 may be advanced and a compression ratio may be increased, improving fuel consumption of the vehicle.

Also, since the supercharged air is supplied to the cylinders of the second cylinder bank 20 through the electric supercharger 60, it may be confirmed that the driving region with the boosting of the electric supercharger 60 (referring to a region B of FIG. 5) is extended rather than the driving region (referring to a region A of FIG. 5) when being the four-cylinder naturally aspirated engine in the low speed low load region.

That is, the region A is a region where the engine is configured to be operated as a naturally aspirated engine, and in the instant case, the engine load may be controlled through the opening of the throttle valve 45. The region B of FIG. 5 is a region where the engine load is controlled through the boosting of the electric supercharger 60 and the opening of the throttle valve 45.

In the low speed high load region, the CDA device 30 is not operated such that the engine is configured to be operated as the eight-cylinder engine. In the instant case, the supercharged air is supplied to the cylinders of the first cylinder bank 10 and the second cylinder bank 20 through the electric supercharger 60 such that the driving region may be expanded in the low speed.

In the low speed high load region, the engine load is controlled by the supercharged pressure by the control of the motor 62 of the electric supercharger 60 and the opening of the throttle valve 45, and the bypass valve 43 is blocked, preventing backflow of the supercharged air.

In the instant case, since the engine is configured to be operated as the eight-cylinder engine and the cylinders of the first cylinder bank 10 are operated, the turbocharger 50 is also operated, however the amount of the exhaust gas exhausted from the cylinders of the first cylinder bank 10 is not large in the low speed region such that the boosting by the turbocharger 50 is limited.

In a middle speed region in which the engine speed is relatively higher than in the low speed region, the CDA device 30 is not operated and the engine is configured to be operated as the eight-cylinder engine.

Accordingly, the turbocharger 50 is configured to be operated by the exhaust gas exhausted from the cylinders of the first cylinder bank 10, and the turbocharged air is supplied to the cylinders of the first cylinder bank 10 and the second cylinder bank 20 by the turbocharger 50. Also, the supercharged air may be supplied to the cylinders of the first cylinder bank 10 and the second cylinder bank 20 by the electric supercharger 60.

That is, in the middle speed region, the boosting may be realized by the turbocharger 50 and the electric supercharger 60, the engine load is controlled through the supercharged pressure of the turbocharger 50 and the electric supercharger 60 and the opening of the throttle valve 45, and the bypass valve 43 is blocked when the electric supercharger 60 is operated, thereby preventing backflow of the supercharged air.

In a high speed region in which the engine speed is relatively higher than in the middle speed region, the CDA is not operated and the engine is configured to be operated as the eight-cylinder engine.

Accordingly, the turbocharger 50 is configured to be operated by the exhaust gas exhausted from the cylinders of the first cylinder bank 10, and the turbocharged air is supplied to the cylinders of the first cylinder bank 10 and the second cylinder bank 20 by the turbocharger 50.

That is, the boosting by the turbocharger 50 is realized in the high speed region.

In a case of a conventional turbocharger 50, since a flow amount of the exhaust gas increases in the high speed region such that the turbine 52 is rotated beyond a rotation acceptable limit, an overload problem of the turbine 52 is generated. To solve this problem, the wastegate valve is used to bypass a part of the exhaust gas exhausted from the cylinders. In this case, almost half of the exhaust gas exhausted from the cylinders bypasses the turbine 52.

However, in the engine system according to an exemplary embodiment of the present invention, since only the cylinders of one cylinder bank (the first cylinder bank 10) are connected to the turbine 52 of the turbocharger 50, it is not necessary to bypass the exhaust gas supplied to the turbine 52 of the turbocharger 50 in the high speed region. Accordingly, the wastegate valve used in the conventional turbocharger 50 may be omitted, thereby reducing the manufacturing cost of the vehicle.

As described above, the engine system according to an exemplary embodiment of the present invention is configured to be operated as the four-cylinder engine or the eight-cylinder engine through the CDA device 30. Accordingly, when the engine system is configured to be operated as the four-cylinder engine in the low speed region, an unnecessary pumping loss is configured to be reduced such that the fuel consumption of the vehicle may be improved.

Also, since the portion of cylinders (the cylinders of the first cylinder bank 10) are deactivated by the CDA device 30 in the low speed region and the exhaust gas exhausted from the activated cylinders (the cylinders of the second cylinder bank 20) bypasses the turbocharger 50, the back pressure may be reduced and a high compression ratio may be realized.

Further, since the turbocharger 50 is mounted at one cylinder bank of two cylinder banks, the manufacturing cost of the vehicle may be reduced and a space inside the engine compartment may be efficiently utilized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. An engine system comprising:
    an engine including a first cylinder bank and a second cylinder bank, each including a plurality of cylinders generating a driving torque by combustion of a fuel;
    a throttle valve provided at an intake manifold distributing an intake gas to the cylinders of the first cylinder bank and the second cylinder bank to control an intake amount of the intake gas;
    a first exhaust manifold gathering exhaust gas exhausted from the cylinders of the first cylinder bank to be supplied to a first exhaust line;
    a second exhaust manifold gathering the exhaust gas exhausted from the cylinders of the second cylinder bank to be supplied to a second exhaust line;
    a turbocharger including a turbine rotated by the exhaust gas exhausted through the first exhaust manifold and a compressor rotated in connection with the turbine to compress external air;
    a cylinder deactivation (CDA) device selectively deactivating the cylinders of the first cylinder bank;
    an electric supercharger including a motor to supply supercharged air to the cylinders of the first and second cylinder banks and an electric compressor operated by the motor,
    a first exhaust gas processing device mounted to the first exhaust line;
    a second exhaust gas processing device mounted to the second exhaust line; and
    a main exhaust gas processing device mounted to a main exhaust line in which the first exhaust line and the second exhaust line are joined,
    wherein the exhaust gas exhausted from the first exhaust manifold is directly exhausted to the turbine and exhaust gas exhausted from the second exhaust manifold is directly exhausted to the second exhaust gas processing device.

2. The engine system of claim 1, wherein
    a bypass line bypassing a portion of air supplied to the electric supercharger is provided at the intake line, and
    a bypass valve is mounted at the bypass line.

3. The engine system of claim 1, wherein
the CDA device is configured to be operated in a low speed low load region to deactivate the cylinders of the first cylinder bank.

4. The engine system of claim 3, wherein
when the cylinders of the first cylinder bank are deactivated by the CDA device, an engine load is configured to be controlled through a supercharged pressure of the electric supercharger and an opening of the throttle valve.

5. The engine system of claim 2, wherein
in a low speed high load region,
the CDA device is configured not to be operated, an engine load is configured to be controlled through a supercharged pressure of the electric supercharger and an opening of the throttle valve, and the bypass valve is configured to be blocked.

6. The engine system of claim 2, wherein
in a middle speed region,
an engine load is configured to be controlled through a supercharged pressure of the turbocharger and the electric supercharger and an opening of the throttle valve, and the bypass valve is configured to be blocked.

7. The engine system of claim 2, wherein
in a high speed region,
the electric supercharger is configured not to be operated and an engine load is configured to be controlled through a turbocharged pressure of the turbocharger and an opening of the throttle valve.

8. The engine system of claim 1, wherein
the engine is a V-type engine.

9. The engine system of claim 1, wherein
the engine is a W-type engine.

* * * * *